United States Patent [19]

Garay et al.

[11] Patent Number: 5,598,529
[45] Date of Patent: Jan. 28, 1997

[54] COMPUTER SYSTEM RESILIENT TO A WIDE CLASS OF FAILURES

[75] Inventors: Juan A. Garay, Yonkers; Kenneth J. Perry, Riverdale, both of N.Y.

[73] Assignee: International Business Machines Corporation, Armonk, N.Y.

[21] Appl. No.: 416,594

[22] Filed: Apr. 3, 1995

Related U.S. Application Data

[63] Continuation of Ser. No. 870,013, Apr. 15, 1992, abandoned.
[51] Int. Cl.$^6$ .................................................. G06F 11/34
[52] U.S. Cl. .................................. 395/182.09; 371/36
[58] Field of Search .............................. 395/575, 182.09, 395/182.1, 182.21; 371/2.1, 2.2, 8.1, 8.2, 7, 10.1, 11.1, 11.3, 19, 68.3, 36

[56] References Cited

U.S. PATENT DOCUMENTS

| | | | |
|---|---|---|---|
| 4,356,546 | 10/1982 | Whiteside et al. | 371/36 |
| 4,569,015 | 2/1986 | Dolev et al. | 364/200 |
| 4,644,542 | 2/1987 | Aghili et al. | 371/22.1 |
| 4,771,427 | 9/1988 | Tulpule et al. | 371/8.1 |
| 4,816,989 | 3/1989 | Finn et al. | 364/200 |
| 4,907,232 | 3/1990 | Harper et al. | 371/11.3 |
| 4,914,657 | 4/1990 | Walter et al. | 371/11.3 |
| 4,980,857 | 12/1990 | Walter et al. | 364/900 |
| 5,193,175 | 3/1993 | Cutts, Jr. et al. | 395/575 |
| 5,210,871 | 5/1993 | Lala et al. | 395/650 |
| 5,216,675 | 6/1993 | Melliar-Smith et al. | 371/32 |
| 5,269,016 | 12/1993 | Butler et al. | 395/575 |
| 5,276,823 | 1/1994 | Cutts, Jr. et al. | 395/575 |

OTHER PUBLICATIONS

Fault–Tolerant Computing Symposium (FTCS 17), 6 Jul. 1987, Pennsylvania, USA 48–54, XP002006783, F. J. Meyer et al. "Consensus with Dual Failure Modes" *p. 51, left–hand column, line 3 – right–hand column, line 28*.

Proceedings 7th Symp. on Reliable Distributed Systems, 10 Oct. 1988, Columbus, OH, USA, pp. 93–100, XP000573312, P. Thambidurai et al.: "Interactive consistency with Multiple failure Modes:" *p. 96, left–hand column, line 13 – right–hand column, line 34 *.

Proc. 11th Int. Conf. of the Chilean Computer Society, 15 Oct. 1991, Santiago, Chile, pp. 313–321, XP002006784, P. Berman et al.: "BIT Optimal Distributed Consensus".

Eugene S. Amdur et al. (On the message complexity of binary byzantine agreement under crash failures, 1992, pp. 175–186.

Bracha, G.; An O(log n) Expected Rounds randomized Byzantine generals protocol, (Oct. 1987) pp. 910–920.

Bracha, G. and Toueg, S.; Asynchronous consensus and Broadcast protocols; (Oct. 1985) pp. 824–840.

IBM TDB vol. 30 No. 11 Apr. 1988, Family of Early–Delivery Atomic Broadcast Protocols.

IBM TDB vol. 30 No. 11 Apr. 1988, Polynomial Byzantine Agreement Protocols.

*Primary Examiner*—Robert W. Beausoliel, Jr.
*Assistant Examiner*—Albert Décady
*Attorney, Agent, or Firm*—Louis J. Percello

[57] ABSTRACT

This invention includes a consensus protocol, a broadcast protocol and a fault tolerant computer system created by using the two protocols together in combination. The protocols and system use the minimum number of processors to create a system tolerant of concurrent processor crash and byzantine failures. The protocols are subject to certain validity conditions. The system in the state of consensus is guaranteed to have all non-faulty processors in agreement as to what action the system should take. The system and protocols can tolerate up to t total number of processor failures, no more than b of which may fail in the byzantine mode.

3 Claims, 9 Drawing Sheets

COMPUTER SYSTEM RESILIENT TO A WIDE CLASS OF FAILURES

This is a continuation of U.S. patent application Ser. No. 07/870,013 filed on Apr. 15, 1992 that is now abandoned.

BACKGROUND OF THE INVENTION

1. Field of the Invention

The invention generally relates to the fault tolerance of a system of computer processors. More specifically, the invention relates to a system of computer processors that use protocols which allow the system to continue to operate properly after a number of processors have failed due to a crash (ceased operation) and another number of processors have concurrently failed by acting arbitrarily (byzantine failure).

2. Description of the Prior Art

There are many computer system applications which require fault tolerant systems, i.e., computer systems that operate properly even after failure of one or more processors in the system. These applications, often performing critical monitoring and control functions, include: air traffic control systems, nuclear reactor control systems, telephone switching systems, aircraft and spacecraft control systems, financial funds-transfer systems, and "Wall Street" securities trading systems.

The prior art commonly uses multiple processors in these computer systems to provide a level of tolerance to failures. Often these processors perform the same function, i.e., the processors replicate one another. Multiple processor systems can tolerate the failure of one or more processors by relying on the remaining non-faulty processor(s) which replicate and perform the functions of the failed processor(s). For example, in an aircraft flight-control system, it may be necessary for a processor to acquire a signal from a sensor, use this signal to determine how to change the position of a flight-control surface (e.g., a rudder), and finally issue a signal to actually change the position. If only a single processor performed this function and if this processor were to fail, safe operation of the aircraft would be compromised. However, replicating these functions in multiple processors enhances aircraft safety because some number of non-faulty processors are likely to be available for proper control even if other processors fail.

Fault tolerant systems use computer programs called protocols to ensure that the system will operate properly even if there are individual processor failures. One fault tolerant computer system design uses many replicated processors and two types of protocols together. These two protocols are: 1. broadcast protocols, i.e., fault tolerant broadcasting of a signal to all the processors in the system and 2. consensus protocols, i.e., fault tolerant ways of reaching a consensus. In essence, all the non-faulty processors first determine identical values for system inputs by having the inputs disseminated by a broadcast protocol. Then all the processors perform whatever calculation is required on the inputs in order to individually purpose an output action. Finally, all run a consensus protocol so that the non-faulty processors agree on a common output action.

With respect to the previous example of an aircraft flight-control system, a broadcast protocol could be used to ensure that the same sensor output was attained as input for use by each of the replicated processors in the computer system. The replicated processors could then perform whatever calculation was necessary, based on the sensor output, to determine a direction in which to move a flight-control surface. A consensus protocol could then be used so that all non-faulty processors agreed on the direction to move the flight-control surface.

The number of processor failures that a broadcast or consensus protocol can tolerate is affected by how many processors fail and the mode of processor failure. Processors fail when they no longer properly perform the functions that they where designed to perform. There are two failure modes: crash failures and byzantine failures. A processor has a crash failure, the first mode, if the processor performs its design function up to some point in time and thereafter completely stops working. A processor has a byzantine failure, the second mode, if the processor continues to operate but is not properly performing its design function. The behavior of a byzantine processor is totally arbitrary and unconstrained. At different times a byzantine processor may: 1. perform its design function, 2. crash (perform nothing), or 3. work in an erroneous or arbitrary manner (perform but not properly), e.g., it renders a false result for a calculation.

A fault-tolerant broadcast protocol has as its purpose the reliable dissemination of a signal generated by one "broadcasting" processor (or sensor), i.e., a broadcaster, to a set of other processors even though some system processors have failed. Essentially, the non-faulty receiving processors of the system agree on, i.e., determine, what signal the broadcaster sent. Broadcast protocols are necessary because the broadcasting processor may send a signal to only a single processor at a time and the broadcaster could fail prior to having sent the signal to each desired processor. In the event of broadcaster failure, some processors in the system: 1. have determined the signal while others have not (in the case that the broadcaster fails by crashing), or 2. have determined different signal values (in the case that the broadcaster fails by acting arbitrarily). A fault-tolerant broadcast protocol ensures that all non-faulty processors eventually determine the identical signal value, and, in the case that the broadcasting processor is non-faulty, that the determined signal value is the one generated by the broadcaster.

A fault-tolerant consensus protocol enables each processor to propose an action (via a signal) that is required to be coordinated with all other processors in the system. A fault-tolerant consensus protocol has as its purpose the reaching of a "consensus" on a common action (e.g., turning a switch off) to be taken by all non-faulty processors and ultimately the system. Consensus protocols are necessary because processors may send signals to only a single other processor at a time and a processor failure can cause two processors to disagree on the signal sent by a third failed processor. In spite of these difficulties, a fault-tolerant consensus protocol ensures that all non-faulty processors agree on a common action and that this action is one proposed by a non-faulty processor.

To reach consensus, consensus protocols first enable each processor to propose an action (via a signal) that is later to be coordinated by all the processors in the system. The system then goes through the steps of the consensus protocol. After completing the consensus protocol steps, the common action of the consensus is determined. For example, in a flight-control system, there may be several processors, each equipped with its own sensor, that perform a calculation determining whether the aircraft needs to be moved up or down. In marginal situations, some processors may propose that the craft move up while others propose that it move down. It is important that all non-faulty processors reach consensus on the direction and therefore act in concert in moving the craft.

Prior art discloses that if computer systems using a broadcast and consensus protocol have enough processors, they can tolerate a number of failures solely in the crash mode. According to the prior art, for a system of n processors to tolerate up to t failures of the crash type, it is necessary that n>t, i.e., there must be at least one more processor in the system then there are crash failed processors. In other words, if all the replicated processors in the system fail except one, the system will tolerate these failures because the single working processor can still perform the function of the system. For example, in order to tolerate up to 2 processor failures of the crash type, a computer system utilizing 3 processors may suffice. This is because the broadcast and consensus protocols are able to operate under such conditions and at least one non-faulty processor is always operational and available to undertake the necessary computation and output actions.

These systems and their protocols do not tolerate any number of byzantine processor failures concurrent with the crash failures.

Other prior art discloses computer systems, with a sufficient number of processors, that can tolerate a number of faulty processors which have failed solely in the byzantine mode. These systems require a given number of processors, n, in excess of three times the number of byzantine processor failures to be tolerated, i.e., for a system of n processors to tolerate up to t failures of the byzantine type, it is necessary that n>3t. For example, in order to tolerate up to 2 processor failures of the Byzantine type, a computer system utilizing 7 processors may suffice. This is because the broadcast and consensus protocols are able to operate under such conditions and, if the output action is determined by having all processors reach consensus, an identical output action is performed by all non-faulty processors, whose number, which is at least 5 in this example, exceeds the number of byzantine processors, which is at most 2 in this example. Thus the majority of processors perform identical actions.

These systems and their protocols can tolerate up to t byzantine failures, some or all of which can be byzantine crash type failures, but these systems require more than 3t processors to operate.

3. Problems with the Prior Art

The limitations of the prior art leave designers of fault tolerant computer systems with a dilemma—systems tolerant of the larger but less common class of failures (byzantine) require more processors (and expense) than systems tolerant of the smaller but more common class of failure (crashes). A system designer can make a fault tolerant system that can only tolerate t crash failures (and no byzantine failures) by designing a system with a minimum of t+1 processors. While this system will tolerate the most common failures, i.e., crash failures, just one processor failing in the byzantine mode could cause a total system malfunction with catastrophic results. Alternatively, a designer could build a fault tolerant system which tolerates t byzantine failures with a minimum of 3t+1 processors in the system. In this case, the designer has likely added many more processors to the design to attain a system which tolerates the least probable processor failure. Costs for systems of this sort could be prohibitive, especially if each processor is a large computer system.

Accordingly, there has been a long felt need in the industry for a fault tolerant computer system design that can tolerate (is resilient to) concurrent crash and byzantine processor failures but that does not require a large number of processors. There is no prior art known to the inventors that can tolerate both crash and byzantine failures in a fault tolerant computer system with fewer than 3t+1 processors.

Objectives of the Invention

It is an objective of this invention to create an improved fault tolerant computer system which can tolerate both crash and byzantine processor failures concurrently.

It is also an objective of this invention to create a fault tolerant computer system which can tolerate both crash and byzantine processor failures concurrently with fewer than 3t+1 processors in the system, where t is the highest number of total processor failures that the system can tolerate.

It is also an objective of this invention to create a fault tolerant computer system with the minimum possible number of processors that can tolerate a given number, t, of both crash and byzantine processor failures concurrently.

It is a further objective of this invention to create a consensus protocol capable of tolerating both crash and byzantine failures.

It is a further objective of this invention to create a broadcast protocol capable of tolerating both crash and byzantine failures.

SUMMARY OF THE INVENTION

The present invention is a system of computer processors which can tolerate up to a determined number of total concurrent processor failures, t, some of which may be of the crash type and some of which, b, may be of the byzantine type. The system will use the minimum possible number of processors to continue to perform certain functions properly despite these processor failures. The minimum number of processors for this type of fault tolerant system is t+2b+1.

Generally, the system has n number of processors. Each processor can only communicate sequentially with every other processor in the system. Sequential communication means that one processor can only send a message to one other processor at a time.

Because failures can occur in the middle of sending a sequence of messages, the system uses a novel fault-tolerant broadcast protocol to ensure that a common value is determined by the non-faulty processors to be the one generated by a broadcasting processor. The system also uses a novel fault-tolerant consensus protocol to enable the system of processors to agree on a common action to perform as a system.

The consensus protocol dictates that each processor in the system sends a signal (or a message) to all other processors in the system. The signal typically is a binary value, which may vary from sending processor to sending processor. In cases in which a binary value is insufficient to represent all possible signal values, a consensus protocol could be executed for each bit of the signal value's binary representation. The sending processor sends its signal to each processor in the system in a sequential manner, i.e., first to one receiving processor then the next until all receiving processors are sent the same signal. (Each sending processor may or may not send itself a signal). All the processors in the system may perform this task concurrently.

During the consensus protocol, each of the receiving processors creates a first vector of received values as it receives signals from each of the other processors. After its first received value vector is filled, each processor performs a first test using the values in the first vector, the value of n (the number of processors), the values of b (the maximum number of byzantine failures that the system will tolerate), and t (the maximum number of total failures that the system will tolerate). The result of this test for each processor is a first result value. Each processor then sends its first result value to each of the other processors again in a sequential manner. Each of the processors then creates a second vector of received values as it receives the first result values from each of the other processors. After the second vector of received values is filled, each processor then performs a second test using the second vector of received values and the values b to produce a second result value. These second result values are then exchanged among the processors in a special exchange called the King's exchange. A third vector, consisting of a single received value is filled, and a third test is performed using this value and the values of n, b and t. A third result value is then obtained. This procedure is repeated an appropriate number of times after which each processor attains a final result.

If there are no more then t total processor failures and if no more than b of these failures are of the byzantine type, performing the above consensus protocol guarantees that all non-faulty processors will attain the same final result. Moreover, since the number of non-faulty processors exceeds 2b, the number of non-faulty processors will exceed the maximum number b of byzantine faulty processors whose actions cannot be constrained. Consequently, the non-faulty processors constitute a majority of the remaining functioning processors so the action taken by the system will be determined by the final result attained by the non-faulty processors, which predominate.

Constraints, called validity conditions, are placed on consensus protocols and relate the values of input signals of the processors to the value attained as a final result of the consensus. Validity conditions help ensure that the final result attained by the consensus protocol is meaningful, correct, and non-trivial. Validity conditions help ensure the value attained as the final result of the consensus protocol is at least related to the input signal values at each processor. Validity conditions help prevent erroneous and trivial system consensus, such as, all processors choosing the same constant value as a final result (e.g., always directing the airplane to move down).

Validity conditions are also placed on broadcast protocols and relate the value determined to be the one generated by the broadcasting processor to the actual value generated by the broadcasting processor. Broadcast validity conditions help ensure that the determined value is related to the value generated by a non-faulty broadcasting processor. These conditions prevent, for example, all processors from determining a same constant value regardless of which value was generated by the broadcasting processor.

The broadcast protocol dictates that a broadcaster, a broadcasting processor or sensor, send a binary-valued signal (or a message) to each other processor in the system in a sequential manner, i.e., first to one receiving processor then to the next until all processors are sent the same signal. In cases in which a binary value is insufficient to represent all possible signal values, a broadcast protocol could be executed for each bit of the signal value's binary representation. Each receiving processor uses the value received from the broadcasting (or some default value if non is received) as the input value for a consensus protocol (described above). Thus, the broadcast protocol uses the consensus protocol to determine what signal was actually generated by the broadcasting processor. The broadcast protocol dictates that if there are no more then t total processor failures and if no more than b of these failures are of the byzantine type, all non-faulty processors determine a common value for the signal generated by the broadcasting processor. Moreover, the Broadcast validity conditions that are placed on a protocol dictates that if the broadcasting processor is non-faulty, the determined valued is the one generated by the broadcasting processor.

A fault tolerant computer system which tolerates no more then t total processor failures such that no more than b of these failures are of the byzantine type, can be made by combining a type of the broadcast and a consensus protocols described above.

DETAILED DESCRIPTION OF THE INVENTION

This invention includes a consensus protocol, a broadcast protocol, and a fault tolerant computer system created by using the two protocols in combination.

Figure 1:
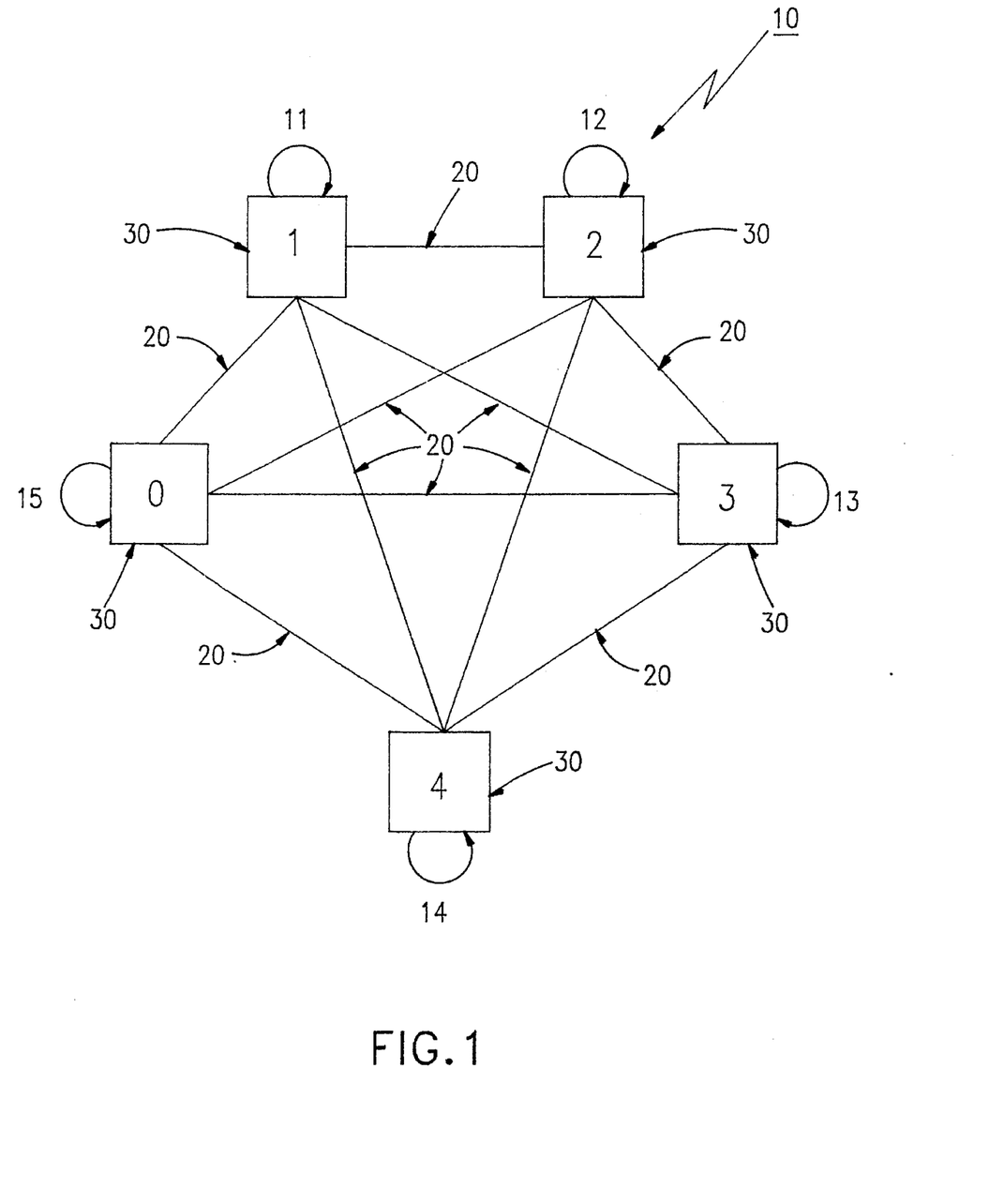
FIG. 1 shows a typical computer system with multiple processors.

FIG. 1 shows an example of a common computer system 10 consisting of 5 processors (0 through 4), which are connected via communication lines (11 through 15 and 20). Each processor 30 may be any type of computer processor known in the art from a computer on a chip to a large computer system. The communication lines can be any communication means commonly known to transmit date from one processor 30 to another. For instance, the communication lines may be either single, bi-directional communication lines 20 between each pair of processors 30 or one unidirectional line in each direction 20 between each pair of processors 30. These computer systems 10 and communication lines 20 are well known in the art. In addition, the communication lines 11 through 15, shown as communicating information from and to the same processor, are shown to facilitate the description. In the case where a processor 30 sends information to itself, an equivalent result could be achieved by merely moving data within the processor and not sending it over a communication line to itself.

The processors (0 through 4) in the system of FIG. 1 need not completely replicate themselves to produce a fault tolerant system. However, functions of the processors related to actions performed by the entire system 10 are replicated in each of the processors 30 and are used by the present consensus and broadcast protocols. The consensus and broadcast protocols of this invention operate together on a computer system 10 like this to make the entire system tolerant to concurrent crash and byzantine failures of some of the system processors 30. Each protocol and the fault-tolerant computer system on which they operate can tolerate t number of total processor failures, b of which are failures of the byzantine type. The system requires only t+2b+1 processors to achieve this level of fault tolerance.

Figure 2:
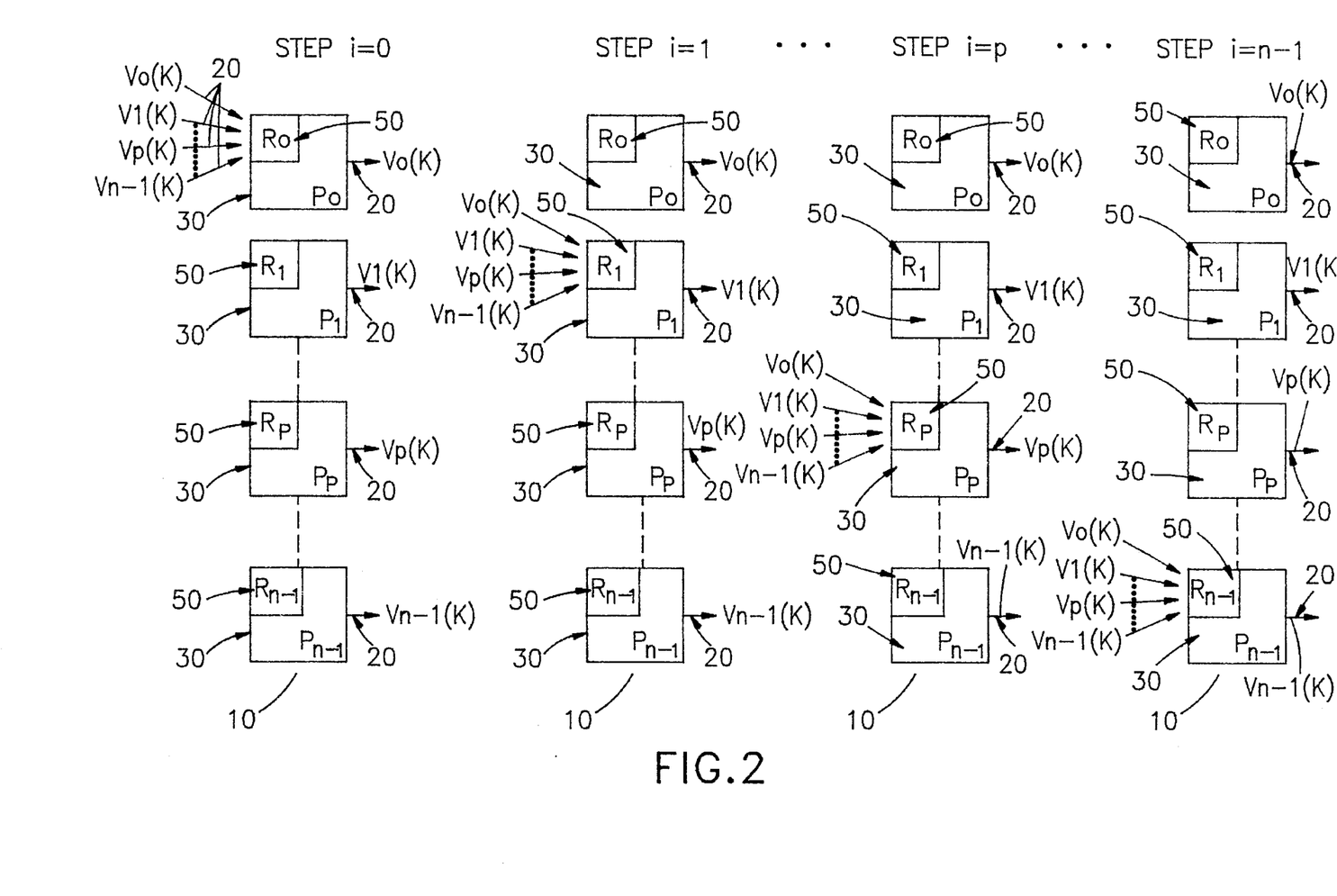
FIG. 2 illustrates an exchange of information among processors in a system of computer processors.

FIG. 2 shows a general case of the present fault tolerant computer system. As before, the communication lines 20 can be single and bidirectional or double and unidirectional between each processor. Each of the n processors, numbered $p_0$ through $p_{n-1}$, can communicate with itself in any convenient manner known in the art. In any round, K, (a round is described below) a processor 30 may send a value, V, to other processors 30 in the system. A typical value, V, sent from a typical processor, $p_p$, in the system of n processors during a typical round, K, is designated as $V_p$ (K).

Figure 2A:
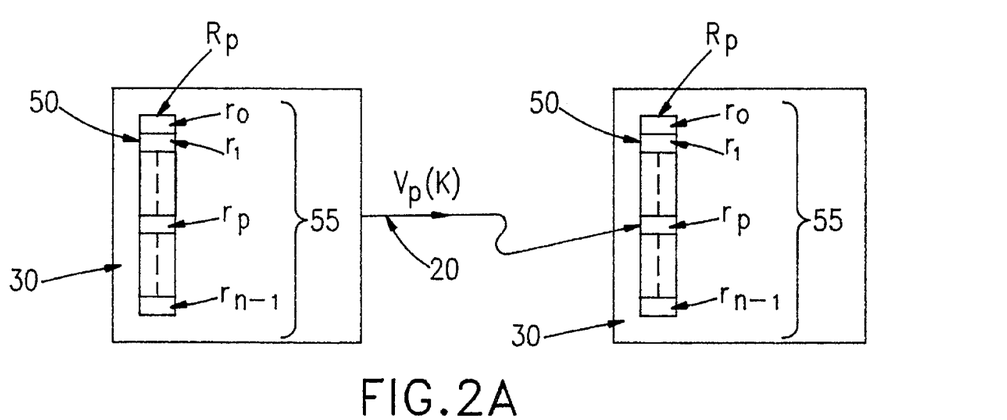
FIG. 2a shows two typical processors in the present fault tolerant computer system with receiving vectors of n memory locations.

FIG. 2a shows a typical processor, $p_p$, sending a value $V_p$ (K) to another typical processor, $p_q$. Each processor 30 has a receiving vector 50, R, in which are stored the values that the processor receives from other processors. In FIG. 2a, the sending processor, $p_p$, has a receiving vector 50, $R_p$, and the receiving processor, $p_q$, has a receiving vector 50, $R_q$. As shown in FIG. 2a, each receiving vector 50 in each processor 30, has a minimum of n memory locations 55, typically $r_p$, for storing values V received from the other processors 30 in the system. During a step in a round K when the sending processor 30, $p_p$, sends its value $V_p$ (K) to receiving processor 30, $p_q$, the receiving processor $p_q$ places the received value $V_p$ (K) into a memory location $r_p$ in its receiving vector $R_q$ designated for processor $p_p$.

FIG. 2 shows one round or iteration, K, of exchanging values among the processors of the system. A round is the period of time during which each processor 30 in the system updates the memory locations 55 in its receiving vector 50, typically with the values V which all the non-faulty processors send. When running the present broadcast and consensus protocols, the processors in the system typically perform a calculation after the round is complete. Since a typical processor 30 can only send a value V to one other processor at a time, a round requires a minimum of number n of steps, i, for a typical processor 30 to send a value V to each processor 30 in the system 10. For example, a typical processor, $p_p$, would send its value $V_p$ (K) to one other processor during each step of a typical round K until the value $V_p$ (K) is sequentially sent to all the processors in the system 10. All processors can perform this same task simultaneously.

FIG. 2 shows one type of round called an exchange round or an exchange. During the first step of the round, i.e., step i=0, every processor in the system sends its particular value V to processor $p_0$. In the example in FIG. 2, the processor $p_0$ is the receiving processor for step i=0 in the exchange round or iteration K. During step i=0, each processor in the system sends its value V to processor $p_0$. These values, represented by the signals $V_0$ (K) through $V_{n-1}$ (K) respectively, are the outputs of each of the processors 30 in the system 10 designated as $p_0$ through $p_{n-1}$. Note also that processor $p_0$ sends the value $V_0$ (K) to itself during this step. Upon receiving a value, typically $V_p$ (K), from the processors in the system, the receiving processor in step i=0 (in this example the processor $p_0$) places each value received in its appropriate memory location, $r_p$. These memory locations 55 are shown in FIG. 2a as $r_0$ through $r_{n-1}$ of the receiving vector 50 and are designated $R_0$ for processor $p_0$. Note that a faulty processor, for example processor $p_q$, may fail to send a value to the receiving processor. In such cases, the receiving processor updates the appropriate memory location $r_q$ within the receiving vector with a value that indicates that no value was received (an "empty value"). When all values sent in step i=0, i.e. $V_0$ (K) through $V_{n-1}$ (K) of the round, have been received by the receiving processor, here $p_0$, the receiving vector 50, here $R_0$, is completely updated. Generally, a receiving vector R is updated in a processor 30 after its memory locations 55 contain the current values (or empty values) of all the processors in the system that are required to send the receiving processor a value during a round or iteration K. At this point in the example of FIG. 2, step i=1 begins. In step i=1, every processor in the system sends its value to the next receiving processor, i.e., $p_1$. Receiving processor $p_1$ then stores each value received from the processors 30 in the system 10 in its appropriate memory location. A typical memory location is designated $r_p$, in $p_1$'s receiving vector 50 ($R_1$). The memory locations in $R_1$ are then filled until the receiving vector $R_1$ is updated for the round. This procedure continues so that in each step of the round (iteration) a receiving processor 30, typically $p_p$, updates its receiving vector 50, typically $R_p$, with all the values sent to it by the processors 30 in the system 10 during the round, K. When the last step, i.e. step i=n−1, of the round is completed, the final processor $p_{n-1}$, has updated its receiving vector $R_{n-1}$. At this point all processors 30 in the system 10 have updated their receiving vectors 50. After all receiving processors have updated receiving vectors with all values to be sent to them, the exchange of information among the processors is complete and the round or iteration called the exchange round is finished.

Note that FIG. 2 illustrates only one example of the exchange of information among the processors of the system. In this example, each processor in the system sequentially sends its value $V_p$ (K) to the processors in the system in numerical order, i.e., processor 30, typically $p_p$, sends its value $V_p$ (K) first to processor $p_0$, then to processor $p_1$, and then to each processor, typically $p_p$, in the system 10, in numerically increasing order until the last processor, $p_{n-1}$, is sent the value $V_p$ (K). This scheme, as shown in FIG. 2, results in each receiving processor in the system receiving values from all processors in the system at one step in the round. However, there are many variations on this scheme to accomplish the goal of updating the receiving vector 50 of each processor 30. All of these schemes are within the contemplation of the invention. For instance, a typical processor $p_p$ could send its value, typically $V_p$ (K), to the other processors 30 in the system in any type of sequence, even a random sequence. The other processors could send their values in the same or different sequences. The processors could even pause or perform other tasks in the middle of their sequential transmissions. The main criteria for the successful exchange of information is that each processor 30 receives and updates its receiving vector 50 with either the values, typically $V_p$ (K), that the sending processors of the round need to send, or with "empty" for those faulty processors that fail to send, before the round ends.

Figure 3:
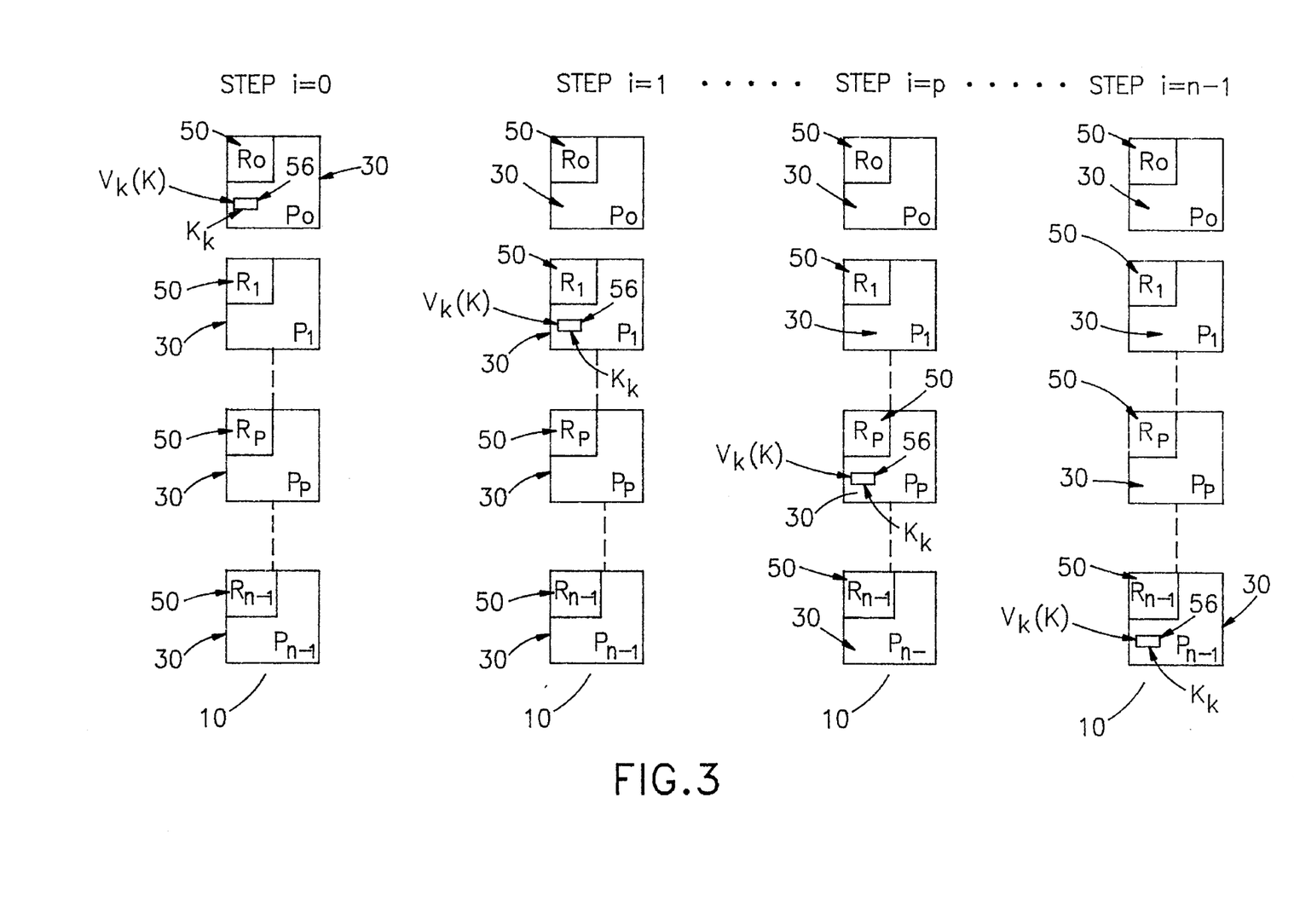
FIG. 3 shows a King's exchange of information among the processors in the present fault tolerant computer system.

FIG. 3 shows a special case of an exchanging round used by the present broadcast and consensus protocols. This type of round is called the King's round or King's exchange. The King's round is basically the same as the exchange round except that there is only one processor, $p_K$, called the "King", which sends its value $V_K$ (K), to all the processors in the system. If a processor does not receive a value from the King during a King's exchange, then the King is faulty and the processor acts as if it had received a fixed default value, e.g., 0, from the King. The processors 30 in the system 10 do not update their receiving vectors 50 with the King's value. However, the King's value, $V_K$ (K), that the King processor, $p_K$, sends, is placed in a separate processor memory location $k_K$ called the King's value location 56. Once all the processors 30 in the system 10 have updated their King's value location 56 with the value, $V_K$ (K), that the King processor, $p_K$, sends, the round, K, is complete. Again, the King processor can send information to the processors in the system in any sequence as long as all the processors 30 update their King's value location 56 with the King's value, $V_K$ (K) before the round is complete. In the present consensus protocol, at least t+1 processors in the system 10 have the opportunity to be the King of a round.

The vector 50 of memory locations 55, shown in detail for processors $p_p$ $p_q$ in FIG. 2a, can be stored in any suitable memory location. However, at a minimum, there must be a enough memory locations 55 associated with each processor receiving vector 50 to store all the values V, that a processor 30 receives in an exchange round. A processor could also have separate vectors 50 with memory locations 55 for each iteration. Alternatively, the locations 55 may be overwritten after a calculation following a round and reused. Further, as long as a received value is identified as coming from a specific sending processor 30, the received values, V, can be stored in any order in the memory locations 55.

The present broadcast and consensus protocols operate on a system 10, like the one described above, to insure that the system 10 is fault-tolerant. Each protocol will tolerate a total of t processor failures, b of which are byzantine failures. The protocols operate on the system as follows. First, a broadcaster, a processor or sensor, sends data, observations, and/or requested actions to each processor in the system. This transmission is sent in the form of a value using a broadcast protocol in order to determine what value the broadcasting processor or sensor generated. This determined value is then adopted by and resides with all the processors. (This broadcast protocol determination is then repeated for each broadcaster (processor or sensor) in the system.) Once all the values broadcast by all the broadcasters in the system are determined by the broadcast protocol, a set of determined broadcast values representing each broadcast in the system resides on each processor. Each processor then performs some calculation using the common set of determined values. Each processor performs the same calculation and reaches some result. (For example, the air plane engine power indication determined from one processor broadcaster and the air plane pitch determined from another processor broadcaster result in a set of determined broadcast values residing on every system 10 processor 30. Every processor of the system then uses these determined values to calculate a result, i.e., how fast to make the air plane go up.) A consensus protocol is then run on the results of all the processors in the system to determine agreement on what the system should do (how fast to make the air plane go up). The result of the consensus protocol will determine what action the system will take.

A consensus protocol which can tolerate t total processor failures, b of which are of the byzantine type, is the firs step in building the present fault tolerant system. The consensus protocol of the present invention comprises: exchanging of information among all the processors of the system, creating a vector of received values in each processor, performing a test using the received values in the vector and other parameters to achieve a result, and repeating these steps until a final result is achieved. Validity conditions, discussed below, constrain the result.

Figure 4:
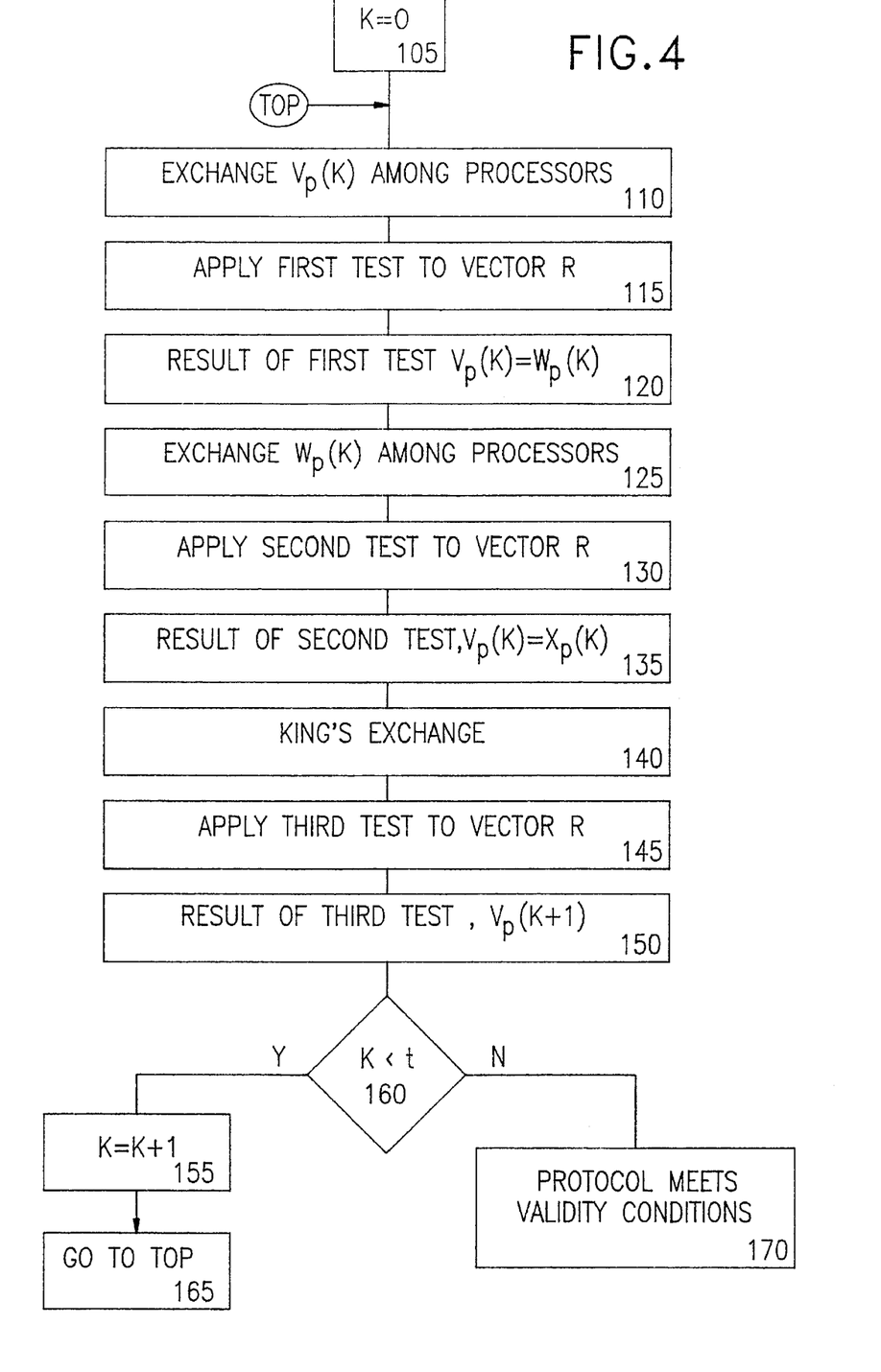
FIG. 4 is a flow chart of a preferred embodiment of the present consensus protocol.

FIG. 4 is a flow chart of one preferred embodiment of the present consensus protocol. It consists of (t+1) number of iterations, referred to as iteration numbers 0 through t. The value t represents the total number of failures of any type that the system is designed to tolerate. Any typical iteration is referred to as iteration K. In this embodiment, the system of processors starts (iteration K=0) 105 by exchanging information 110 in the manner described above and shown in FIG. 2. After the first exchange, each processor 30 applies a first test 115 using the values in its updated receiving vector 50. (See FIG. 5 and the discussion below for the details of the consensus tests.) Using this first test, each processor 30 generates a new first result 120 referred to as $W_p$ (K) for each typical processor $p_p$. Each processor then replaces 120 its output value $V_p$ (K) with the result of the first test $W_p$ (K). All the processors of the system 10 then exchange the output value $W_p$ (K) again 125. Each processor 30 then applies a second test using the newly updated values in its receiving vector 50. Using this second test, each processor 30 generates a new second result 135 referred to as $X_p$ (K) for each processor. The second result then replaces 135 the first result as the output of each processor. All the processors of the system 10 then perform a King's exchange 140 according to the description above and FIG. 3. The King's exchange does not update the values in the receiving vector 50 but stores the King's value in a separate location 56. After the King's exchange 140, each processor applies 145 a third test using the current receiving vector 50 and the King's value. Using this third test 145, each processor 30 generates a third result 150. The third result for each processor then replaces 150 the second result as the output of each processor. These output values (the third test results 150) become the processor outputs used to start the next iteration of the consensus protocol and are therefore again referred to as $V_p$. A new iteration is initiated 155 and 165 unless it is determined 160 that the system has performed t+1 iterations. When the system 10 has completed (t+1) number of iterations, the values $V_p$ (t) will become the final result of the consensus protocol for the system. Having run the consensus protocol guarantees that the $V_p(t)$ for all non faulty processors is the same and certain validity conditions are met 170. This is called the state of consensus.

Figure 5:
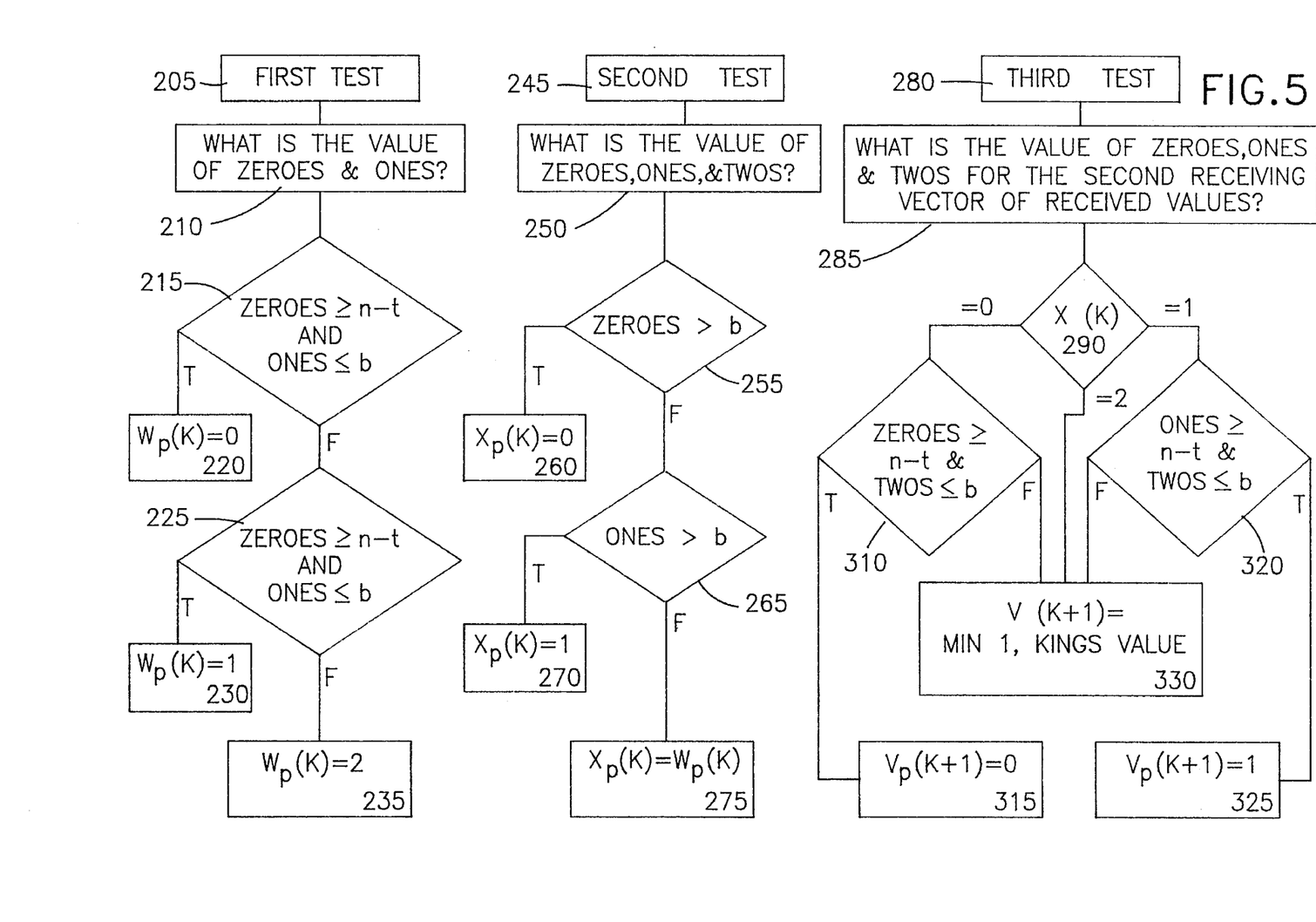
FIG. 5 is a flow chart of the three tests used in the preferred consensus protocol.

FIG. 5 shows the three tests performed by the system in the consensus protocol described above. Three variables are defined for these tests. In each processor 30, the variable "Ones" is equal to the number of memory locations 55 in the receiving vector 50 containing the value 1 before the respective test is run. In like manner for each processor 30, the variable "Twos" is equal to the number of memory locations 55 in the receiving vector 50 containing the value 2 and the variable "Zeroes" is equal to the number of memory locations 55 in the receiving vector 50 containing the value 0.

When running the first test 205, each processor 30 counts the number of its memory locations 55 that contain the values 0 and 1 and, using the above definitions, determines 210 the value of its variables Zeroes and Ones. At this point, a first logical comparison 215 is made to decide if the value of Zeroes is greater than or equal to the number of non-faulty processors the system can tolerate (i.e. n-t) AND if the value of Ones is less than or equal to the number of byzantine type failures the system is designed to tolerate, b. If the comparison 215 is true the first result value, W, is assigned 220 the value 0. If the first logical comparison 215 is false, a second logical comparison 225 is made to decide if the value of Ones is greater or equal to (n-t) AND if the value of Zeros is less than or equal to b. If the second logical comparison is true, the first result value, W, is assigned 230 the value 1. If the second logical comparison is false, the first result value, W, is assigned 235 the value 2.

Prior to executing the first test, the non-faulty processors which are n-t in number have values, V, that are either 0 or 1. Because there are only two binary values allowed (here 0 and 1), at least (n-t)/2 of these non-faulty processors have the same value, called the majority value. This set of processors is called the majority non-faulty processors. Since the number of processors in the system, n, is greater than t+2b (i.e. n>t+2b), the number of the non-faulty majority processors, (n-t)/2, will exceed, b, i.e., (n-t)/2>b. If the majority value is zero, then at every non-faulty processor Zeros will be greater than b because each processor of the non-faulty majority sends a 0 to every other processor. Similarly, if the majority value is 1, the Ones value in every processor will be greater than b. Therefore, if the majority value is 0 (or 1), the conditions of test 1 (blocks 225 or 235 are true) are arranged so that is impossible to assign W=1 (or 0). As a result, the first result value is reassigned the majority non-faulty processor's value (0 or 1) or a value, 2, indicating an uncertainty (block 235).

The second test 245 begins by counting the occurrences of the values 0, 1, and 2 in the memory locations 55 in the receiving vector 50 of each processor 30. In this way, the value of the variables Zeroes, Ones, and Twos is determined 250. A comparison 255 is done to determine if the value Zeroes is greater than b. If Zeroes is greater than b, the second result value, $X_p(K)$, is assigned 260 the value 0. If Zeroes is not greater than b, the value of the variable Ones is compared 265 to b. If Ones is greater than b, the second result value, $X_p(K)$, is assigned 270 the value 1, if not, the second result value, $X_p(K)$, is made 275 equal to the first result value, $W_p(K)$.

The second test enables a non-faulty processor to determine a number of processors that claim to have assigned the majority value as a result of the first test. If decision points 255 or 265 are true, then because there are no more than b processors that may fail in the byzantine mode, a least one non-faulty or at least one non-byzantine failed processor sent a 0 or 1 respectively to the receiving processor, claiming this value to be the majority. Since processors that are either non-faulty or not failed in the byzantine mode correctly follow the steps of the first test, it can therefore be assured that this is in fact the majority value. In these cases, the second result value, $X_p(K)$, is set equal to either 0 or 1 (block 260 or 270 respectively) because at least one of the processors sending this value must be non-byzantine. If both decision points (255 and 265) are false, the second result value is set equal to the first result value because no conclusions can be drawn from the second test. Therefore, the second result value is reassigned the majority non-faulty processor's value (0 or 1) or a value, 2, indicating an uncertainty.

The third test 280 again begins by counting the numbers of the values 0, 1, and 2 in the memory locations 55 in the receiving vector 50 of each processor 30. As before, the value of the variables Zeroes, Ones, and Twos is determined 285 for each processor 30. The nature of the third test is determined by the second result value of the processor 290. If the second result value is 0 and the logical condition 310 is true, the resulting value, $V_p$ (K+1), which will be sent by the processor at the start of the next iteration is 0 (see block 315). The logical condition of block 310 is that the value of the variable Zeros is greater than or equal to the number of non-faulty processors (n-t) AND the value of the variable Twos is less the number of tolerated byzantine mode failures b. If the second result value 290 is 1 and the logical condition 320 is true, the resulting value $V_p$ (K+1), which will be sent by the processor a the start of the next iteration is 1 (see block 325). The logical condition of block 320 dictates that the value of the variable. Ones is greater than or equal to the number of non-faulty processors (n-t) and that the value of the variable Twos is less than or equal to b. If the second result value 290 is 2 or if logical conditions 310 or 320 are false, the resulting value, $V_p$ (K+1) is set equal to the minimum value of 1 or the value sent by the King in the previous exchange (block 330).

If either logical condition 310 or logical condition 320 is true, there is a strong indication that agreement may have been achieved. If there is no strong indication, the King determines whether the third result value is 0 or 1. The third test causes the third result value to be either 0 or 1. Note that 2 is not a possible selection for the resulting value of the third set. Therefore, at the start of the next iteration, the system processors 30 will only be sending 0's or 1's.

The implication of the third test is that there will be consensus at the end of the test if the King is a non-faulty processor. This is because, the resulting value of all processors will be determined by a very strong agreement in a logic test (blocks 310 or 320 are true) or by the output of a non-faulty processor. As a result, the consensus protocol can guarantee consensus of the system of processors by running the above iterations until an iteration is run which has a non-faulty King. Since there are at most t faulty processors in the system, at least one non-faulty King will exist in an iteration if the iteration is run t+1 times. At the end of t+1 iterations (e.g. K starts incrementing from 0), each processor will have a final result value, $V_p$ (K=t) and the system will be in the state of consensus. In other words, running the consensus protocol guarantees that the final result values of all non-faulty processors are equal.

Other variations of this consensus protocol are possible and within the contemplation of the inventors. For instance, a similar protocol can be devised that iterates 3t+3 times. In this consensus protocol, the first test will be run after an exchange in the first iteration; the second test will be run after an exchange in the second iteration; and the third test will be run after a third iteration. By repeating this set of three iterations t+1 times, the same protocol as described above develops except that the three separate tests of FIG. 5 become three parts of one single larger test. Which test part to run and which values to use in each test part are determined by counting the iterations and keeping track of the values used in each test part. Techniques for counting and keeping track of values are well known in the art.

Certain protocols usually constrain the final values of the processors in the system in some way. The level of constraint is classified in terms of validity conditions. For instance, the final value may be constrained to be identical to the input value of some non-faulty processor. For example, in an aircraft flight-control system where the input signal value corresponds to a processor's desire to move the aircraft either up or down, and where the final result causes the aircraft to actually move, it is clearly desirable that the final result (direction moved) match the desire of at least one non-faulty processor. If the result where not so constrained, faulty processors could always force the final result to indicate that the aircraft move downwards.

Varying validity conditions can indicate a stronger requirement on the consensus. For instance, a stronger condition might require that the final result match the input value of a non-faulty processor in the case where all non-faulty processors have identical input values.

For the purposes of this invention, validity conditions for consensus protocols fall into three classes: strong, weak, and frangible. The definitions of these validity conditions is as follows:

1. The "Strong" validity condition states that if at least (n-t) non-faulty processors start the consensus protocol with the same value of $V_p$ (0), then at each non-faulty processor the final result of the consensus protocol is equal to that value.

2. The "Weak" validity condition states that if n non-faulty processors (that is, all the processors are non-faulty) start the consensus protocol with the same value of $V_p$ (0), then at each non-faulty processor the final result of the consensus protocol is equal to that value.

3. The "Frangible" validity condition states that if n-b non-byzantine processors (that is, the non-faulty processors and the processors that fail only by crashing) start the consensus protocol with same value of $V_p$ (0), then at each non-faulty processor the final result of the consensus protocol is equal to that value.

Note that a consensus protocol that meets the strong validity condition also meets the frangible and weak validity conditions. Likewise, a consensus protocol that meets a frangible validity condition also meets the weak validity condition.

A broadcast protocol which can tolerate t total processor failures, b of which are of the byzantine type, is another requirement of the present fault tolerant system. The broadcast protocol of this invention uses the consensus protocol described above to achieve agreement among all system processors about what value was determined as sent by a particular broadcaster (broadcasting processor or sensor). The result of this consensus is called the determined value. The determined value is used by all the processors in the system to represent the value generated by the broadcaster.

Figure 6:
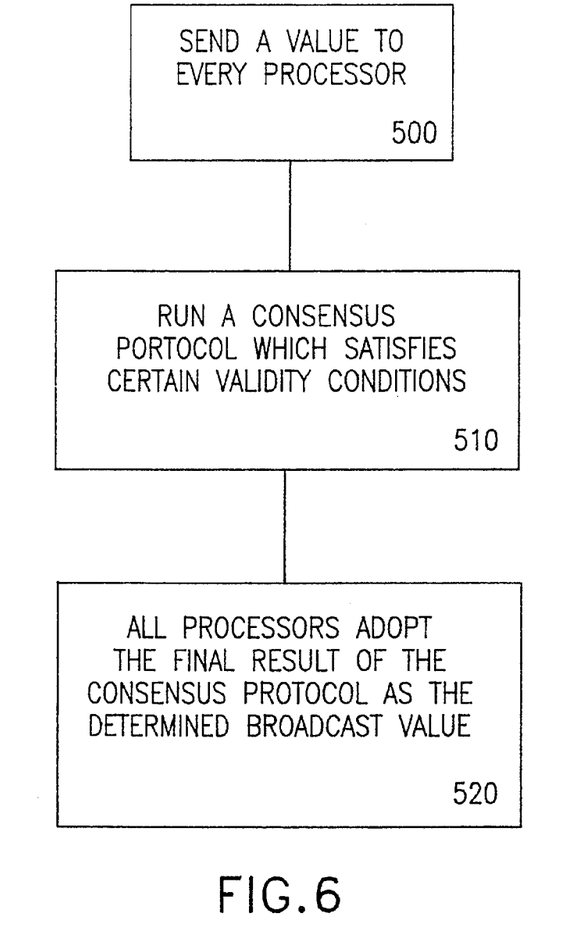
FIG. 6 is a flow chart of a preferred broadcast protocol of the present invention.
Figure 7:
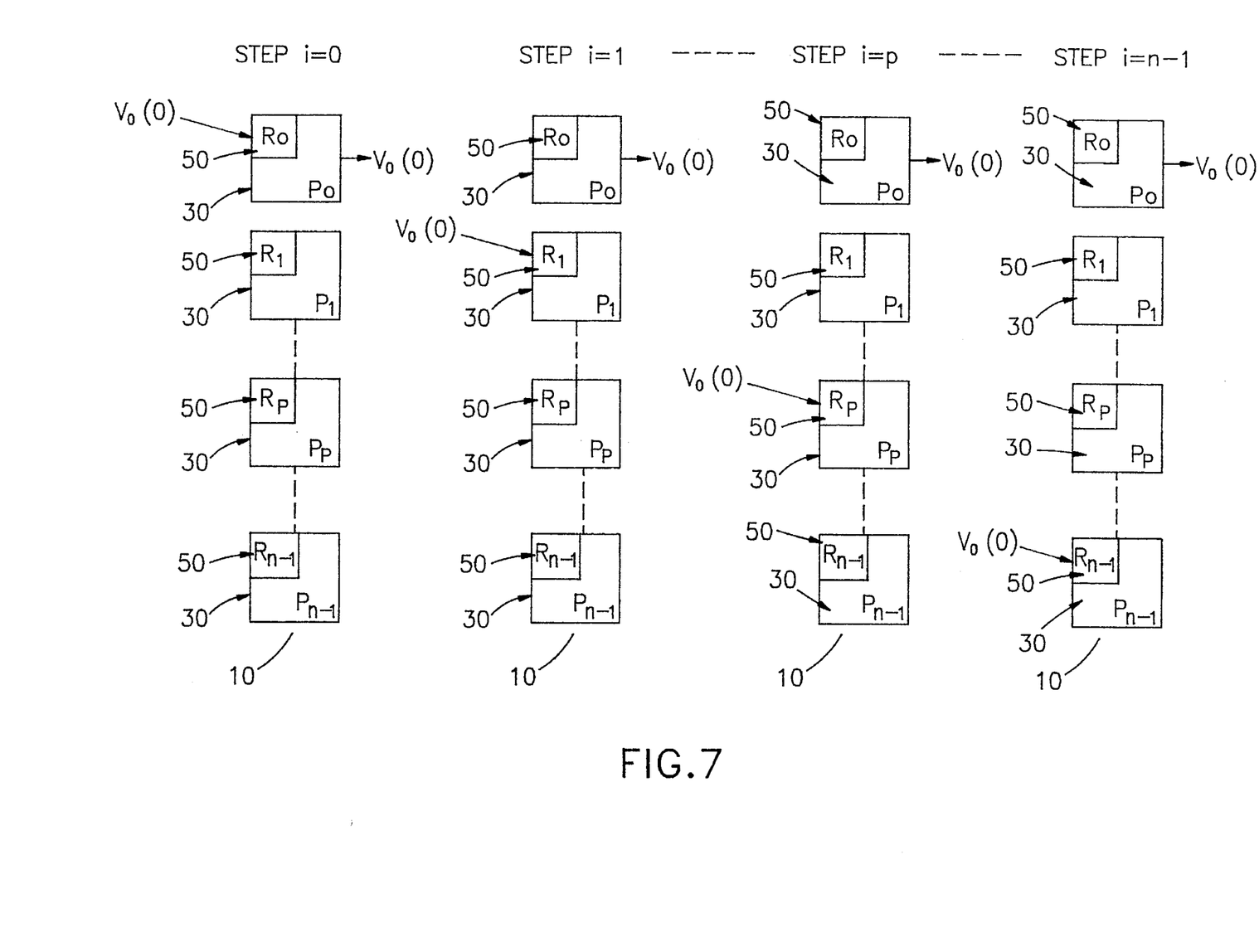
FIG. 7 shows the first step of broadcasting in an embodiment of the present broadcast protocol.

The broadcast protocol is shown in FIG. 6 and works as follows:

1. FIG. 7 shows the first step in a broadcast protocol. The broadcaster, here arbitrarily designated as processor $p_0$, sequentially sends (block 500 in FIG. 6) its value to every processor in the system. This exchange of information is similar to the King's exchange, where the King is the broadcaster.

2. The n processors then achieve consensus 510 on V using a consensus protocol that is tolerant of up to t failures of which up to be may be byzantine.

3. The final result of the consensus protocol determined in step 2 is adopted 520 by all processors as the determined value and considered to be the value generated by the broadcasting processor. Since this determined value was computed by the consensus protocol, every non-faulty processor has an identical determined value. This is true even if the broadcasting processor was faulty in such a way as to send different values to different processors in step 1.

After a broadcast protocol of the present invention is run, all non-faulty processors agree on a common (determined) value that is considered to be the one generated by the broadcasting processor. A common value is determined even if the broadcaster is faulty.

Broadcast protocols also have validity conditions. For the purposes of this invention, there are two validity conditions, weak and strong. A broadcast protocol that satisfies the broadcast weak validity condition is obtained by using a consensus protocol that satisfies at least the weak validity condition in step 2 of the broadcast protocol of FIG. 6. A broadcast protocol satisfying a broadcast weak validity condition constrains the determined value to be the one chosen by the broadcaster only in the case that no processor failures occur. A broadcast protocol that satisfies the broadcast strong validity condition is obtained by using a consensus protocol that satisfies the frangible validity condition in step 2 of the broadcast protocol of FIG. 6. A broadcast protocol satisfying a broadcast strong validity constrains the determined value to be the one generated by the broadcaster only in the case that the broadcaster is non-faulty, regardless of the failure of any other processors.

Note that a broadcast protocol satisfying a broadcast strong validity condition also satisfies a broadcast weak validity condition.

A consensus protocol that satisfies a strong validity condition can be obtained from a broadcast protocol that satisfies the broadcast strong validity condition as follows:

1. Each processor acts as the broadcaster in a separate broadcast protocol resulting in a total n broadcast protocols each of which meets a broadcast strong validity condition.

2. At the end of the n broadcasts, each processor has a receiving vector 50 of n determined values.

3. The final result of the consensus protocol is the majority value in the vector of determined values.

Figure 8:
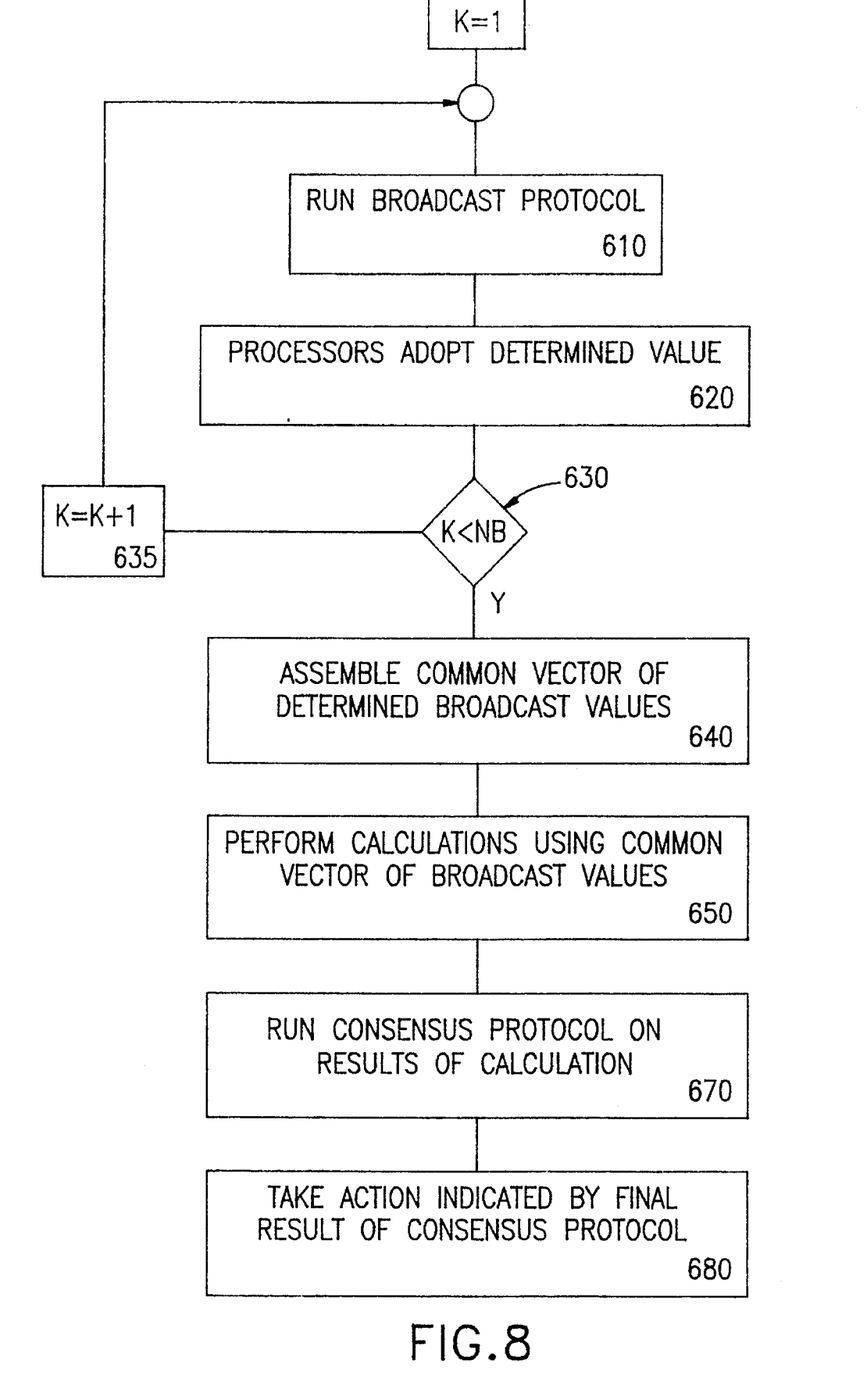
FIG. 8 is a flow chart of the present broadcast and consensus protocols operating on a fault tolerant computer system.

FIG. 8 shows how the broadcast and consensus protocols work together on a computer system which is tolerant of t processor failures, no more than b of which are of the byzantine type. First a broadcaster runs a broadcast protocol of the present invention 610. The value determined by the broadcast protocol is then adopted 620 by the processors in the system. This process is repeated 630 and 635 NB times (where NB is the number of broadcasters) for each processor that needs to disseminate a value, i.e., a broadcaster. When all processors have a vector of common determined broadcast values 640 (one value from each broadcaster), each processor performs a calculation 650 using the same vector of common determined broadcast values. The result is a calculated value 650 for each processor. A consensus protocol of the present invention is then run 670 in order to achieve consensus on the result of the calculation. When the state of consensus is reached, the system will take the action 680 determined by the calculation which the consensus of the processors agree to take.

Figure 9:
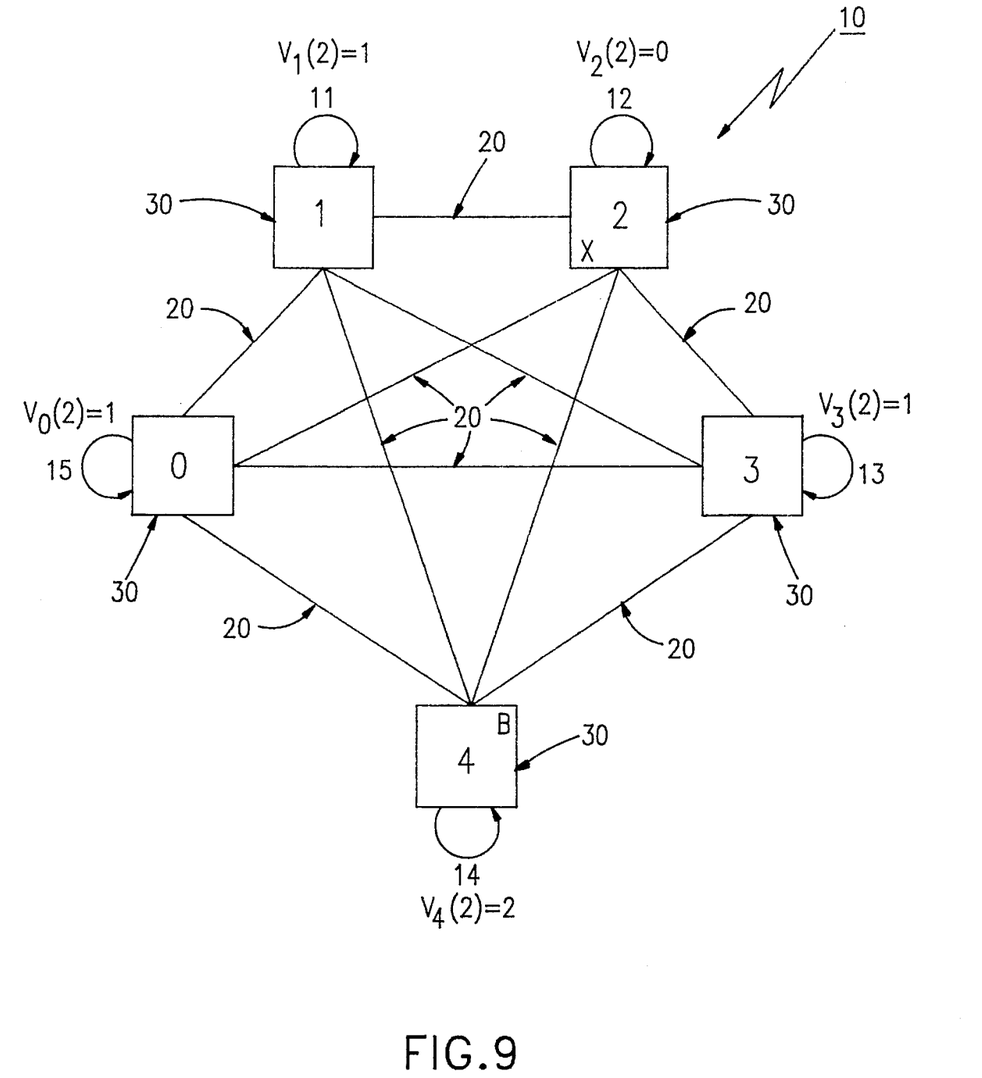
FIG. 9 shows a fault tolerant computer system in the state of consensus.

FIG. 9 shows a computer system 10 of the present invention in the state of consensus. The system, having 5 processors, can tolerate a total, t, of 2 failures, b of which are byzantine (where b=1). The system shown has two failures, a crash type (designated by the "X" in processor 2) and a byzantine type (designated by the "B" in processor 4). The system has undergone 3, i.e., t+1 iterations. In the state of consensus, all the non-faulty processors (processors 0, 1, and 3) have the same values, i.e., equal to 1. The crashed processor (processor 2) has a zero or no output and the byzantine processor (processor 4) has an arbitrary output, i.e. 2. Having achieved consensus, the system is guaranteed that the non-faulty processors will agree and that they will out number the processors failed in the Byzantine mode. The processors that have failed in the crash mode are not relevant since they are no longer functioning.

We claim:

1. A method for a fault-tolerant computer system of n processors to achieve consensus comprising the steps of:

a. exchanging sequentially processor output signals among the processors in the computer system;

b. creating a first vector of received values in each processor, the received values representing the values of the signals sent from each of the system processors;

c. replacing the output signal at each processor with a first result value determined by a first test using the first vector of received values, a maximum number of total tolerated failures, t, the number of system processors, n, and a maximum number of tolerated byzantine failures, b, the first test comparing a first number of a first value in the first vector to n-t and a second number of a second value in the first vector to b to determine the first result value;

d. exchanging the first result value of each processor sequentially among every processor in the computer system;

e. creating a second vector of received values in each processor, the second vector of received values representing the first result values sent from each of the system processors;

f. replacing the output signal at each processor with a second result value determined by a second test using the second vector of received values and the maximum number of tolerated byzantine failures;

g. exchanging, during a round of information exchange called a King's exchange, a second result value of a King processor, the King processor being an only processor in the system that is exchanging values in the King's exchange;

h. creating a third vector, of one value, in each processor, the value of the third vector called a King processor value and representing the second result value sent by the King processor;

i. replacing the output signal at each processor with a third result value determined by a third test using the second vector of received values, the second result value, the maximum number of total tolerated failures, the number of system processors, the maximum number of tolerated byzantine failures, and the King processor value;

j. repeating steps a through i for a number of times one more than a number of total failures that a protocol is designed to tolerate resulting in a consensus meeting at least a minimum validity condition.

2. A method as in claim 1, further comprising the steps of:
a. the first test further comprising the steps of:
  (c1). assigning the first result value for the first value if n-t number or more of the received values of the first vector are equal to the first value and b number or fewer of the received values of the first vector are equal to the second value;
  (c2). assigning the first result value for the second value if n-t or more of the received values of the first vector are equal to the second value and b number or fewer of the received values of the first vector are equal to the first value;
  (c3.) assigning the first result value a third value if the first vector of received values fails the conditions of steps c1 and c2,
b. the second test further comprising the steps of:
  (f1). assigning the second result value for the first value if more than b of the received values of the second vector are equal to the first value;
  (f2). assigning the second result value for the second value if more than b of the received values of the second vector are equal to the second value;
  (f3). assigning the second result value for the third value if the conditions in steps f1 and f2 are failed;
c. the third test further comprising the steps of:
  (i1). assigning the third result value for the first value if the second result value is equal to the first value and n-t or more of the received values of the second vector of received values is equal to the first value and there are b number or less of the received values of the second vector of received values equal to the third value;
  (i2). assigning the third result value for the second value if the second result value is equal to the second value and there are n-t or more of the received values of the second vector of received values equal to the first value and b number or less of the received values of the second vector of received values equal to the third value;
  (i3). assigning the third result value to a value determined by the King processor of exchange if conditions steps i1 and i2 fail.

3. A method, as in claim 2, where the first result value is 0, the second result value is 1, and the third result value is 2.

* * * * *